United States Patent [19]

Hoffa

[11] Patent Number: 5,527,455
[45] Date of Patent: Jun. 18, 1996

[54] FLUIDIZED BED BIOLOGICAL FILTER SYSTEM FOR FISH TANKS

[76] Inventor: Gary Hoffa, 7545 University Ave., La Mesa, Calif. 91941

[21] Appl. No.: 376,928
[22] Filed: Jan. 23, 1995
[51] Int. Cl.⁶ .............................. A01K 63/04; C02F 3/06
[52] U.S. Cl. .................... 210/169; 210/258; 210/264; 210/416.2; 210/661
[58] Field of Search ..................... 210/150, 151, 210/169, 258, 266, 284, 416.2, 661, 110

[56] References Cited

U.S. PATENT DOCUMENTS

| | | | |
|---|---|---|---|
| 1,090,283 | 3/1914 | Crandall | 210/266 |
| 1,430,950 | 10/1922 | Crandall | 210/266 |
| 3,563,888 | 2/1971 | Klock | 210/150 |
| 4,326,963 | 4/1982 | Watson, Sr. et al. | 210/284 |
| 4,411,780 | 10/1983 | Suzuki et al. | 210/150 |
| 4,482,458 | 11/1984 | Rovel et al. | 210/150 |
| 4,693,814 | 9/1987 | Brown | 210/284 |
| 4,834,872 | 5/1989 | Overath | 210/151 |
| 4,894,149 | 1/1990 | Block | 210/169 |
| 5,139,659 | 8/1992 | Scott | 210/169 |

*Primary Examiner*—Peter A. Hruskoci
*Assistant Examiner*—Theodore M. Green
*Attorney, Agent, or Firm*—Charles C. Logan, II

[57] ABSTRACT

A fluidized bed biological filter system for fish tanks having a housing having a top wall, a bottom wall, and surrounding side walls that form a water filtering chamber. An inner tubular member extends upwardly from the bottom wall a predetermined height and it has an inlet port in its bottom end that is connected to a pump. An outer tubular member has a closed top wall and also a diameter that is greater than that of the inner tubular member. The outer tubular member is telescopically mounted on the inner tubular member so that both of their bottom ends are surrounded by filtering particulate in the bottom of said housing. The top end of the outer tubular member has a weight chamber into which various amounts of weights may be added depending on the power of the pump and the type of filtering particulate material used. Water from the pump is directed upwardly through the inner tubular member until it strikes the bottom surface of the top wall of the outer tubular member causing the outer tubular member to rise upwardly. The flow of water is then directed downwardly through the annular space surrounding the inner tubular member and as it reaches the bottom end thereof, it will force the particulate material upwardly into a fluidized pattern.

10 Claims, 2 Drawing Sheets

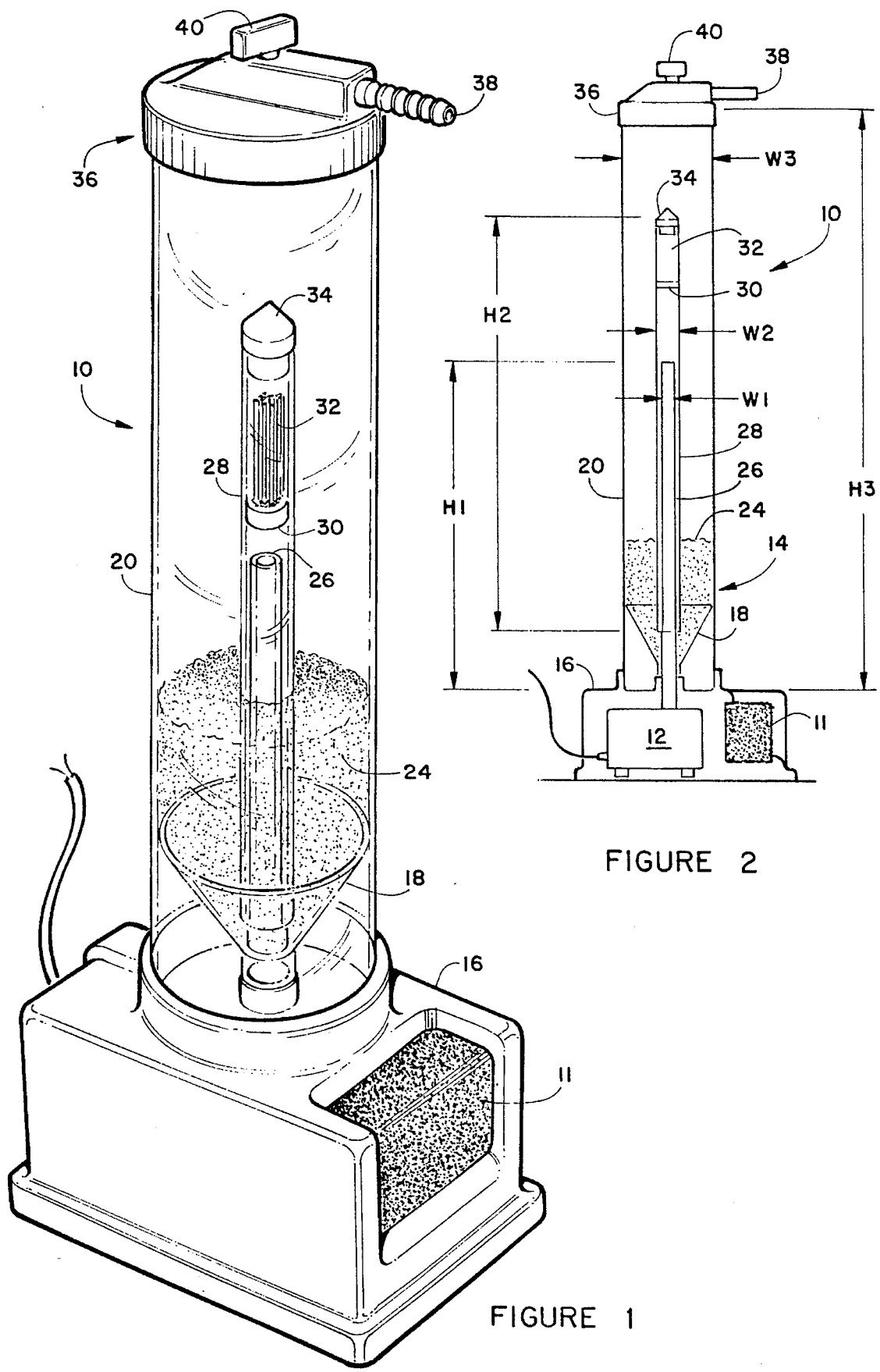

FLUIDIZED BED BIOLOGICAL FILTER SYSTEM FOR FISH TANKS

BACKGROUND OF THE INVENTION

The invention relates to a filtering system and more specifically to a fluidized bed biological filter system for fish tanks.

In recent years more adults and children have gotten into the hobby of having pet fish and raising pet fish. Additionally, fish tanks or aquariums are found in many restaurants and offices. One problem they all have in common is the need to dispose of the fish waste products.

Presently most aquarium's have a separate filtration tank into which the contaminated water is pumped for processing. A major drawback of the present system resides in the fact these filtration tanks are usually between 20 to 50 percent of the size of the fish tank with which it is used. Often times this filtration tank is placed in close proximity to the aquarium tank but preferably out of sight.

Another problem exists in fish tanks which use gravel in their bottom. The water that is pumped through this gravel has a tendency to channel wherever it is easiest to travel. Therefore you have bacteria that is healthy in areas where the water is moving. In the areas the water is not moving, bad bacteria, anaerobic bacteria form pockets of gases. If a person stirs up a pocket of gravel that has not been stirred for three or four months, it will kill all of the fish in a tank.

Another problem with the use of gravel is each piece of gravel has only so much surface area to which the bacteria can attach itself. By using smaller gravel it is possible to obtain more surface area for the bacteria but it cuts down on the space between the respective pieces of gravel and sometimes it compacts into a solid layer.

It is an object of the invention to provide a novel fluidized bed biological filter system that eliminates the need for gravel in the bottom of the fish tank.

It is another object of the invention to provide a novel fluidized bed biological filter system that drastically reduces the size of the tank required for filtering the contaminated water of a fish aquarium.

SUMMARY OF THE INVENTION

The novel fluidized bed biological filtering system is designed to be a more efficient process for converting the primary metabolic (ammonia) to the less toxic form of nitrogen (nitrate). In its preferred form, it would have an upright oriented tubular plastic housing having a bottom wall. An elongated inner tubular member is vertically oriented and it extends upwardly from the bottom wall of the housing and its bottom end would be connected to a pump. Inner tubular member would have a predetermined W1 and this is less than the width W2 of the outer tubular member that is telescopically received over the inner tubular member. The outer tubular member has a predetermined height H2 above said bottom wall that is greater than the height H1 of the inner tubular member above said bottom wall. The top end of the outer tubular member is closed and it has a weight chamber secured adjacent its top end. In one embodiment a removable top cap allows various weights to be placed in the weight chamber and the total amount of weight used may vary depending upon the strength of the pump being used and the type of filter particulate matter used. The preferred particulate media would be glass beads having a diameter between 50 and 300 microns such as described in applicant's co-pending U.S. Pat. No. 5,453,183, Sep. 26, 1995. The bottom wall of the housing would have an inwardly and downwardly converging slope to it and the filtering particulate would cover the bottom wall when the pump is not being operated.

A removable top cap closes the top end of the housing. It has an outlet port whose flow can be regulated by a valve therein. The top cap can be removed for loading filter particulate into the housing and it also allows access to the weight chamber on the top end of the outer tubular member.

The operation of the fluidized bed biological filter system for fish tanks will now be described. The fluidized bed biologic filter unit would normally be placed in the fish tank in an upright position in the water. Prior to the starting of the pump, the filter particulate will have sunk to the bottom of the filtering chamber so that it covers the sloping bottom wall and also the bottom ends of the outer tubular member and the inner tubular member. Also at this time the outer tubular member would have sunk to its bottom most position due to the weight contained in its weight chamber and this would have the bottom end of the outer tubular member in close proximity to the bottom wall of the housing. As the pump is started, flow of water will be forced upwardly through the inner tubular member. As it reaches the top thereof, its force will cause the outer tubular member to float upwardly which will allow the direction of the water flow to be reversed so that it can pass down through the annular space between the outer tubular member and the inner tubular member. This water is then directed to the area adjacent the bottom wall of the housing. The turbulent force of the water will drive the filter particulate into a suspended state inside the housing. It is important that the amount of weight contained in the weight chamber of the outer tubular member be closely matched to the force of the water being pumped upwardly through the inner tubular member. This will keep the gap between the inner tubular member and the bottom wall of the outer tubular member spaced a predetermined height so that a downward flow of water will reach the area adjacent the lower most portion of the bottom wall of the housing. The filtered water will pass upwardly and out through the exhaust port in the top cap.

DESCRIPTION OF THE DRAWINGS

FIG. 1 is a front perspective view of the novel fluidized bed biological filter system for fish tanks;

FIG. 2 is a schematic illustration of the fluidized bed biological filter system prior to the pump being turned on;

DESCRIPTION OF THE PREFERRED EMBODIMENT

Figure 3:
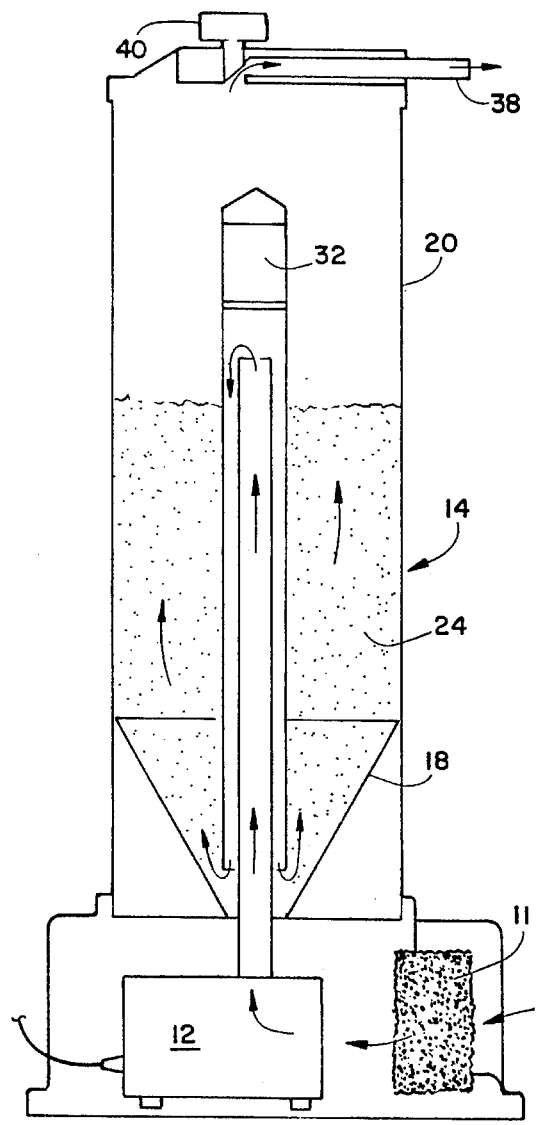
FIG. 3 is a schematic illustration of the fluidized bed biological filter system after the pump has been started and the particulate material suspended in the water.

The novel fluidized bed biological filtering system for fish tanks will now be described by referring to FIGS. 1–4 of the drawings. The filter unit is generally designated numeral 10. The system has a filter 11, pump 12, and housing 14.

Housing 14 is preferably made of transparent or translucent plastic material and it may have a base 16 beneath the bottom wall 18 and tubular wall 20. Tubular wall 20 has a height H3. The top surface of bottom wall 18 is covered by filter particulate 24.

The bottom end of tubular member 26 is connected to connecting member 14. Inner tubular member 26 has a predetermined height H1 and its top end is open. Outer tubular member 28 telescopically surrounds inner tubular member 26. Outer tubular member 28 has a predetermined height H2. Bottom wall 30 closes the top end of outer tubular member 28 and a weight chamber 32 is formed thereabove. Access to weight chamber 32 is had by removing top cap 34. Inner tubular member 26 has an outer width W1, and outer tubular member 28 has an inner width W2. Tubular wall 20 has an outer diameter W3. Top plug 36 has an exhaust port 38 and flow therethrough is controlled by valve 40.

Figure 4:
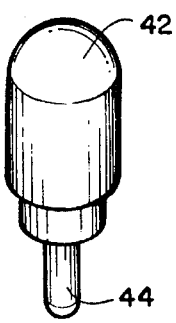
FIG. 4 is an alternative embodiment of the weight chamber.

FIG. 4 shows an alternative weight chamber 42 having a downwardly extending tongue 44 that snugly settles into the top end of inner tubular member 26 when pump 12 is stopped. Weight chamber 42 having a different weight would be chosen based upon the power of the pump and the types of particulate material used.

Figure 5:
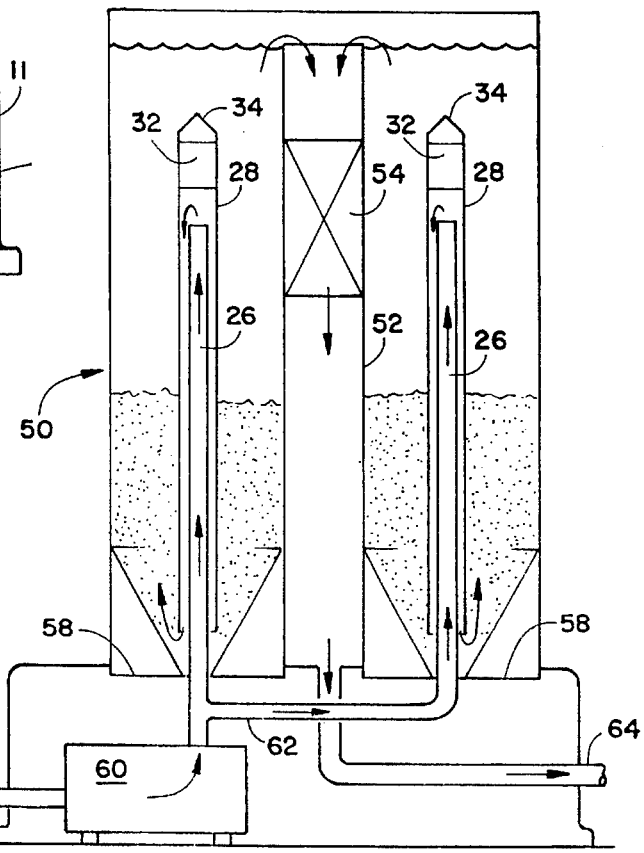
FIG. 5 is an alternative embodiment that shows multiple inner and outer tubular member assemblies in a singular housing.

An alternative embodiment is illustrated in FIG. 5 and it has a housing 50 with a tower 52 extending upwardly in its central area. A bunch of Bioball spacers 54 are positioned within tower 52 to oxygenate water that has been passed through the fluidized bed biological filtering systems. Multiple units of the outer tubular members 28 and inner tubular members 26 may be spaced along bottom wall 58. A pump 60 would be connected by a manifold system 62 to each of the individual tubular members. Water passing out of their exhaust ports would pass over the top edge of the tower 52 and be oxygenated as it passes downwardly through the Bioball spacers and out through port 64.

What is claimed is:

1. A fluidized bed biological filter system for fish tanks comprising:

a housing having a bottom wall and upright surrounding side walls to form a filtering chamber; said housing having an outlet to permit filtered water to exit said housing;

an upright oriented elongated inner tubular member having a width W1, a top end that forms a fluid outlet port, and a bottom end that forms a fluid inlet port to permit contaminated water to enter said housing;

means for mounting the bottom end of said inner tubular member in the bottom wall of said housing with said inner tubular member extending a predetermined height H1 above said bottom wall; an outer tubular member having a width W2 that is greater than W1, a top end that is closed, and a bottom end that telescopes downwardly over said inner tubular member;

filtering particulate having a size in the range of 50–300 microns inside said housing on said bottom wall so that it surrounds the bottom end of said inner tubular member and the bottom end of said outer tubular member;

the flow path of water through said housing begins as it enters the fluid inlet port at the bottom end of said inlet tubular member, the water flows upwardly through said inner tubular member and then outlets into said outer tubular member and directs the water downwardly through said outer tubular member and exits its bottom end and passes through said filtering particulate to be purified; and means for applying weight to said outer tubular member so that it provides a force to counteract the water pressure rising up said inner tubular member that lifts said outer tubular member upwardly and reverses the flow of water down through the filtering particulate surrounding the bottom end of said inner tubular member and said outer tubular member.

2. A fluidized bed biological filtering system for fish tanks as recited in claim 1 further comprising a pump that is connected to the inlet port of said inner tubular member.

3. A fluidized bed biological filtering system for fish tanks as recited in claim 1 wherein said bottom wall slopes downwardly and inwardly toward the bottom end of said inner tubular member.

4. A fluidized bed biological filtering system for fish tanks as recited in claim 1 wherein said housing is cylindrically shaped.

5. A fluidized bed biological filtering system for fish tanks as recited in claim 1 wherein said outer tubular member has a predetermined height H2 and H2 is greater than H1.

6. A fluidized bed biological filtering system for fish tanks as recited in claim 5 wherein said housing has a height H3 and H3 is greater than H2.

7. A fluidized bed biological filtering system for fish tanks as recited in claim 1 wherein said means for applying weight is a weight chamber formed adjacent the top end of said outer tubular member and it can be filled with various amounts of weight depending upon the strength of the pump or type of particulate used.

8. A fluidized bed biological filtering system for fish tanks as recited in claim 1 further comprising a lid for said housing that will limit of the upward travel of said outer tubular member when a pump is operated.

9. A fluidized bed biological filtering system for fish tanks as recited in claim 8 wherein said lid has an outlet port closed by a valve that can regulate outward flow.

10. A fluidized bed biological filtering system for fish tanks as recited in claim 1 wherein said housing contains more than one assemblies of an outer tubular member and an inner tubular member and they are connected to a single pump.

* * * * *